United States Patent
Dubov et al.

(10) Patent No.: US 11,554,518 B2
(45) Date of Patent: Jan. 17, 2023

(54) METHOD FOR PRODUCING A COMPOSITION OF CONSTRUCTION MATERIAL FOR 3D PRINTING

(71) Applicant: Mighty Buildings, Inc., San Francisco, CA (US)

(72) Inventors: Aleksei Dubov, Moscow (RU); Denis Indyk, Tomsk (RU)

(73) Assignee: Mighty Buildings, Inc., San Francisco, CA (US)

( * ) Notice: Subject to any disclaimer, the term of this patent is extended or adjusted under 35 U.S.C. 154(b) by 446 days.

(21) Appl. No.: 16/819,006

(22) Filed: Mar. 13, 2020

(65) Prior Publication Data

US 2021/0283803 A1     Sep. 16, 2021

(51) Int. Cl.
| | |
|---|---|
| *B29B 7/00* | (2006.01) |
| *B29B 13/08* | (2006.01) |
| *C08F 20/06* | (2006.01) |
| C08K 5/00 | (2006.01) |
| B29L 31/00 | (2006.01) |
| C08K 5/053 | (2006.01) |
| B33Y 70/10 | (2020.01) |

(52) U.S. Cl.
CPC .............. *B29B 7/005* (2013.01); *B29B 13/08* (2013.01); *C08F 20/06* (2013.01); *B29L 2031/776* (2013.01); *B33Y 70/10* (2020.01); *C08K 5/0025* (2013.01); *C08K 5/053* (2013.01)

(58) Field of Classification Search
USPC ....................................................... 523/351
See application file for complete search history.

(56) References Cited

U.S. PATENT DOCUMENTS

| | | | |
|---|---|---|---|
| 2016/0060449 A1* | 3/2016 | Shulga ..................... | C09D 4/06 522/179 |
| 2019/0077948 A1 | 3/2019 | Baumann et al. | |
| 2019/0092952 A1 | 3/2019 | Baumann et al. | |
| 2019/0248932 A1 | 8/2019 | Korshikov et al. | |

OTHER PUBLICATIONS

International Search Report in International Application No. PCT/US2021/021252, dated Jun. 8, 2021.

* cited by examiner

*Primary Examiner* — Deve V Hall
(74) *Attorney, Agent, or Firm* — Cognition IP, P.C.; Edward Steakley

(57) ABSTRACT

Systems, devices, and methods are provided for producing a 3d-printable composite material for large scale printing. A method can include receiving a first component comprising a (meth)acrylic monomer or a (meth)acrylic oligomer, or a combination thereof. The method can include receiving a second component comprising a photoinitiator and a third component comprising a polymerization enhancer. The method can include mixing the first component, second component, and third component with a mixing reactor to form a mixture. The method can include filtering the mixture with a filtration unit and removing a solid residue from the mixture. The method can include curing the filtered mixture with a radiation unit into a gel component and a liquid component. The method can include separating the gel component with a phase separation unit and then milling the gel component. And the method can include mixing the gel component, the photoinitiator, the mineral filler and optionally the recycled previously printed composite material to form the composite material.

16 Claims, 4 Drawing Sheets

METHOD FOR PRODUCING A COMPOSITION OF CONSTRUCTION MATERIAL FOR 3D PRINTING

BACKGROUND

Three-dimensional (3D) printing, also known as additive manufacturing, is a technique that deposits materials to exact location, thus resulting in significantly less material wastage than traditional manufacturing techniques, which typically form parts by reducing or removing material from a bulk material. Prototyping and manufacturing, construction, art, dentistry, medical devices, and jewelry are traditional industries of 3D printing applications. During the last five years, 3D components for construction have become an important application to the construction business.

An improved method of the big area 3D printing process of various construction components like wall panels can be beneficial to the construction industry and the environment.

BRIEF SUMMARY

The present disclosure generally relates to systems, devices, and methods for producing 3d printable composites that are utilized in large scale 3D printing process. In one aspect, a method can include receiving a first component including a (meth)acrylic monomer or a (meth)acrylic oligomer, or a combination thereof. The method can include receiving a second component including a photoinitiator. The method can include receiving a third component including a polymerization enhancer. The method can include mixing the first component, second component, and third component with a mixing reactor to form a mixture. The method can include filtering the mixture with a filtration unit and removing a solid residue from the mixture. The method can include curing the filtered mixture with a radiation unit into a gel component and a liquid component. The method can include separating the gel component from the liquid component with a phase separation unit. The method can include milling the gel component with a milling unit. The method can include receiving a fourth component including a mineral filler. The method can include receiving a fifth component including a previously 3D printed material, containing of first, second, third and fourth component, after milling to powder. And in one aspect, the method can include mixing the gel component, the photoinitiator, the mineral filler and the fifth component to form the composite material.

In one aspect, the first component further can include (meth)acrylic functional groups in the amount of 1 through 6 including triethylene glycol methyl ether methacrylate, triethylene glycol dimethacrylate (TEGDMA), 6-acetylthiohexyl methacrylate, or a combination thereof.

In one aspect, the photoinitiator can include Bis (eta 5-2,4-cyclopentadien-1-yl) Bis [2,6-difluoro-3-(1H-pyrrol-1-yl)phenyl]titanium, Diphenyl (2,4,6-trimethylbenzoyl)phosphine oxide, Phenylbis(2,4,6-trimethylbenzoyl)phosphine oxide, 2-Benzyl-2-(dimethylamino)-1-[4-(4-morpholinyl) phenyl]-1-butanone, or a combination thereof.

In one aspect, the polymerization enhancer can include polyethylene glycol 4000, polyethylene glycol 8000, trioctyl benzene-1,2,4-tricarboxylate; di-n-octyl phthalate, or a combination thereof.

In one aspect, the mineral filler can include sodium carbonate decahydrate, $Na_2CO_3 \cdot 10H_2O$, sodium tetraborate decahydrate $Na_2B_4O_7 \cdot 10H_2O$; gypsum $CaSO_4 \cdot 2H_2O$; silicon dioxide $SiO_2$ or a combination thereof.

In one aspect, the method can further include receiving a fifth component including a recycled photopolymer composite material.

In one aspect, the method can further include mixing the gel component, the photoinitiator, the mineral filler, and the recycled photopolymer composite material.

In one aspect, the composite material can be used for large scale 3D printing construction components like wall panels. The construction components can form at least a portion of a building including a wall, a floor, a roof, or a one-piece combination thereof, such as that of a commercial or residential building.

In one aspect, a method for producing a material for 3D printing can include, receiving a first component including a first material, receiving a second component including a second material, receiving a third component including a third material, mixing the first component, second component, and third component to form a mixture, filtering the mixture and removing a solid residue from the mixture, curing the filtered mixture into a gel component and a liquid component, separating the gel component from the liquid component, milling the gel component, receiving a fourth component including a fourth material, and mixing the gel component, the second component, and the fourth component.

In one aspect, the method can further include recycling the liquid component and combining the liquid component with the mixture of the first, second, and third component. In one aspect, the first material can be a (meth)acrylic monomer or a (meth)acrylic oligomer, or a combination thereof, the second material can be a photoinitiator, the third material can be a polymerization enhancer, and the fourth material can be a mineral filler.

In one aspect, the method can further include receiving a fifth component including a fifth composite material, the fifth composite material can be a recycled photopolymer composite material.

In one aspect, the method can further include mixing the gel component, the second component, the fourth component, and the recycled photopolymer composite.

In one aspect, a system for producing a material for 3D printing can include a mixing reactor configured to receive one or more components, each of the one or more components can include a material, and mixed into a mixture, a filtration unit configured to filter the mixture and can separate a solid residue from the mixture, a radiation unit including a radiation emission device, configured to receive and cure the filtered mixture into a gel component and a liquid component, a phase separation unit configured to separate the gel component and the liquid component, a milling unit for milling the gel component, and a second mixing reactor configured to receive and mix the gel component with the one or more components.

In one aspect, the material of the one or more components can be a (meth)acrylic monomer, the material of the one or more components can be a photoinitiator, the material of the one or more components can be a polymerization enhancer, the material of the one or more components can be a mineral filler, and the material of the one or more components can be a recycled photopolymer composite material of the first through the fourth components.

Other examples are directed to systems, devices, and computer readable media associated with methods described herein.

A better understanding of the nature and advantages of embodiments of the present invention may be gained with reference to the following detailed description and the accompanying drawings.

DETAILED DESCRIPTION

Figure 1:
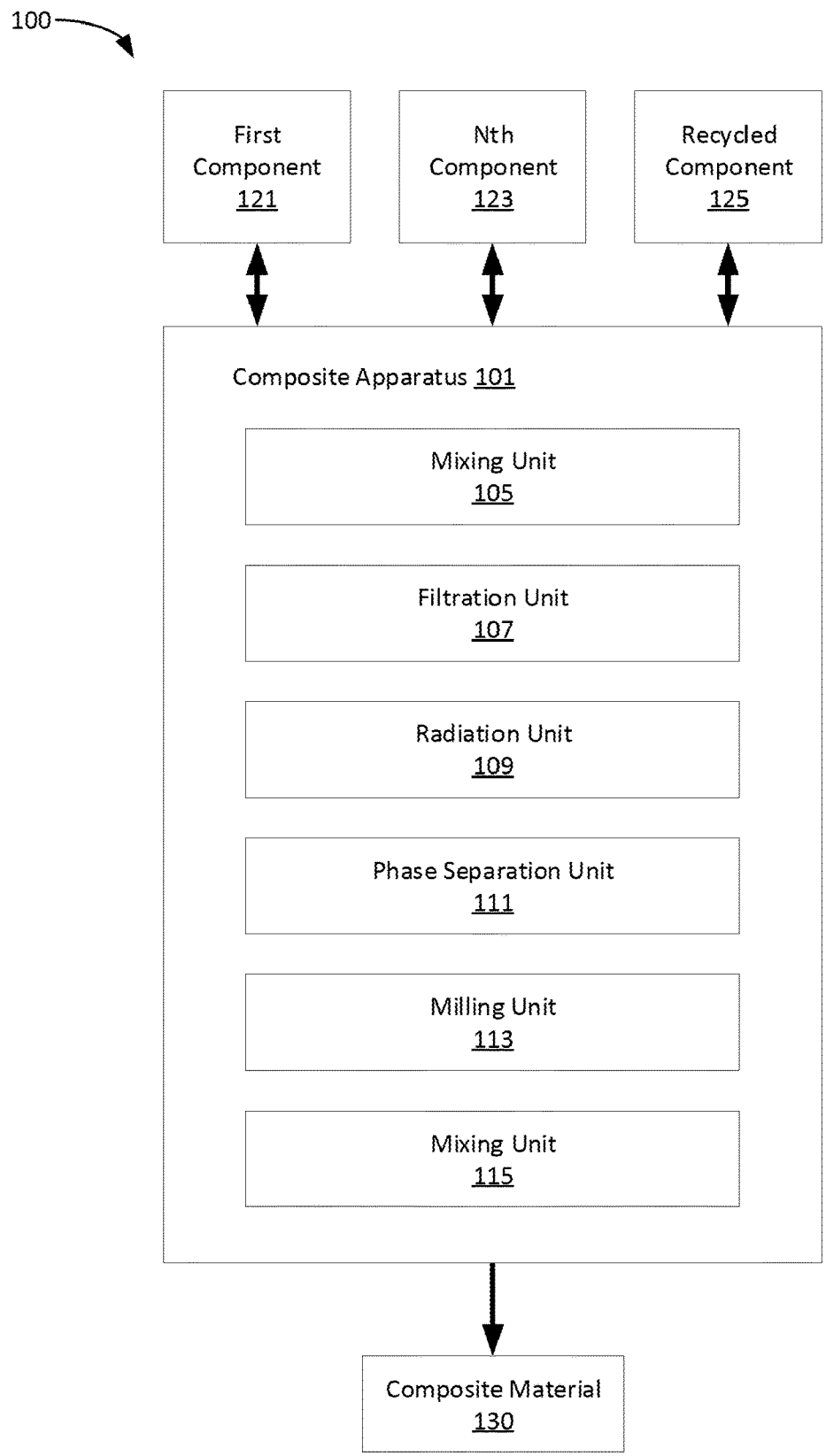
FIG. 1 illustrates a system diagram of a composite producing apparatus in accordance with various aspects of the subject technology.

In this specification, reference is made in detail to specific examples of the disclosure. Some of the examples or their aspects are illustrated in the drawings.

For clarity in explanation, the disclosure has been described with reference to specific examples, however it should be understood that the disclosure is not limited to the described examples. On the contrary, the disclosure covers alternatives, modifications, and equivalents as may be included within its scope as defined by any patent claims. The following examples of the disclosure are set forth without any loss of generality to, and without imposing limitations on, the claimed disclosure. In the following description, specific details are set forth in order to provide a thorough understanding of the present disclosure. The present disclosure may be practiced without some or all of these specific details. In addition, well known features may not have been described in detail to avoid unnecessarily obscuring the disclosure.

In addition, it should be understood that steps of the exemplary methods set forth in this exemplary patent can be performed in different orders than the order presented in this specification. Furthermore, some steps of the exemplary methods may be performed in parallel rather than being performed sequentially.

A system and method for producing a composite material is described below. The discussion generally relates to a system and method of production of composites that are utilized in large scale 3D printing solutions for buildings and building components including commercial and residential buildings. In one example, a system can include a composite apparatus for obtaining a composite formulation containing a monomer or oligomer, a component that initiates the polymerization or polycondensation reaction, a mineral filler, one of which may be previously printed utilizing a big area 3D printer, and milled to powder and reused. Additionally, the system can extract, mix, process, treat, mill, separate, etc., or a combination thereof, components of material to produce the composite material for big area 3D printing.

FIG. 1 illustrates an example system architecture 100 of a composite producing apparatus for producing composite material utilized in big area 3D printing. In one example, the composite material produced by the apparatus is used for 3D printing construction components or complete buildings. The construction components can form at least a portion of a building including a wall, a floor, a roof, or a one-piece combination thereof, such as that of a commercial or residential building. In one example, the system architecture 100 can include a photopolymer composite apparatus, or composite apparatus 101. The composite apparatus 101 can include a mixing unit 105, filtration unit 107, radiation unit 109, a phase separation unit 111, and a milling unit 115. In one example, the composite apparatus 101 can include a second mixing unit 115. In this example system architecture 100, the composite apparatus can receive one or more components used to produce the composite. The one or more components can include receiving a first component 121, a second component, a third component, and so forth including an Nth component 123, each of the components including the first component 121, second component, and nth component 123, are extracted, mixed, processed, separated, etc., or a combination thereof to produce the composite of the received components. Once the components are received and processed through the composite apparatus 101, an output of the composite apparatus 101 can be a composite material 130, the composite material 130 used for big area 3D printing in construction applications.

In one example, the following table illustrates a plurality of components used to produce a composite material utilizing a photopolymerization system and method. As shown in the Table 1 below:

TABLE 1

| Content of each component for the composite material | | | | | |
|---|---|---|---|---|---|
| Description | Component #1 | Component #2 | Component #3 | Component #4 | Component #5 |
| Physical state | Liquid | Powder | Powder | Powder | Powder |
| Content, mass. % | 0-65 | 0-3 | 0-3 | 0-65 | 0-65 |

The composite material can include up to five components. In this example, component #1, or the first component 121 can include a (meth)acrylic monomer or a (meth)acrylic oligomer, or a combination thereof. The component 121 can further include a (meth)acrylic functional groups in the amount of 1 through 6 including triethylene glycol methyl ether methacrylate, triethylene glycol dimethacrylate (TEGDMA), 6-acetylthiohexyl methacrylate, or a combination thereof. In one example, the first component 121, can also include other functional groups such as that of fluorine, chlorine, acryloyl chloride, epoxy, urethane, thiol-ene, maleate and fumarate including 2,2,3,4,4,4-Hexafluorobutyl acrylate, or a combination thereof.

In one example, the first component 121 is in liquid form. The first component 121 can solidify after the first component 121, or a mixture with a photoinitiator including the first component 121 is cured in a curing step, discussed below.

In one example, a second component, to be mixed with the first component 121, can include a photoinitiator for photopolymerization. The photoinitiator is received by the composite apparatus 101 in a solid state with a 0-3% content, mass percentage. In this example, the photoinitiator can include Bis (eta 5-2,4-cyclopentadien-1-yl), Bis [2,6-difluoro-3-(1H-pyrrol-1-yl)phenyl]titanium, Diphenyl (2,4,6-trimethylbenzoyl)-phosphine oxide, Phenylbis(2,4,6-trimethylbenzoyl)phosphine oxide 2-Benzyl-2-(dimethylamino)-1-[4-(4-morpholinyl) phenyl]-1-butanone, or a combination thereof.

The photoinitiator is configured to initiate the polymerization or polycondensation reaction of the composite material 130 produced when the composite material 130 including the photoinitiator is used in the 3D printing process and during the curing process in the radiation unit 109. In one example the polymerization reaction can be obtained by a radiation emitted with a wavelength in the range between Manometer (nm) and 1 millimeter (mm).

In one example, a third component, to be mixed with the first component 121 and second component, in an initial mixing stage or step, can include an enhancer or polymerization enhancer. The polymerization enhancer can be received by the composite apparatus 101 in a solid state with a 0-3% content, mass percentage. The polymerization enhancer can be a polymerized compound with that of different molecular mass such as that of polyethylene glycol 4000, polyethylene glycol 8000, trioctyl benzene-1,2,4-tricarboxylate; di-n-octyl phthalate, or a combination thereof.

In one example, a fourth component, to be mixed later with the mixture of the first component 121, second component, and third component, can include a mineral filler, configured to improve flame resistance including flame retardant, chemical, and mechanical properties of the final produced composite material 130.

In one example, the mineral filler can be received by the composite apparatus 101 in a solid state with a range of 0-65% content, mass percentage. The mineral filler can be an inorganic or organometallic hydrate, salt, oxide, or a combination thereof, including sodium carbonate decahydrate, $Na_2CO_3.10H_2O$; borax, sodium tetraborate decahydrate, $Na_2B_4O_7.10H_2O$; gypsum $CaSO_4.2H_2O$; silicon dioxide $SiO_2$ or a combination thereof.

And in one example, a fifth component, can be mixed later with the mixture of the first component 121, second component, and third component, with the fourth component. The fifth component can be a recycled component 125. The recycled component 125, can include any and all powder obtained from a previously 3D printed composite material, that has the same chemical characteristics as that of composite material 130, in a solid state in the range between 0-65% content, mass percentage.

In this example, the recycled component 125 can be a recycled photopolymer composite material. The recycled material can be derived from a previously produced composite material after the mixture of components is grinded and trimmed into powder. For example, the recycled component 125 received by the composite apparatus 101 can have a grain size between 0.01-3.00 millimeter (mm).

In one example, the mixing unit 105 is a mixing reactor configured to receive one or more components, each of the one or more components can include a material, and mixed into a mixture or formed into a mixture. In this example, the mixing reactor can receive a first component 121 including a first material, receiving a second component including a second material, receiving a third component including a third material. The first material can be a (meth)acrylic monomer or a (meth)acrylic oligomer, or a combination thereof, the second material can be a photoinitiator, the third material can be a polymerization enhancer. Once the mixing unit 105 receives the one or more components, such as the first component 121, second component, and third component, the mixing unit 105 will mix the components to form or mix the components into a mixture.

In one example, the mixing reactor can be a mechanical mixing reactor, circulation mixing reactor, pneumatically mixing reactor, ultrasonic mixing reactor, or include components of a mixing reactor from a combination thereof. In this step, the mixing unit 105 can obtain an equally homogenous or heterogenous mixture of components for the composite apparatus 101 to further process.

In one example, the filtration unit 107 is configured to filter the mixture comprising, for example first component 125, second component, and the third component, from any unwanted or undue substance, such as any solid residue or liquid residue. The filtration unit 107 of the composite apparatus 101 can separate a solid residue from the mixture, such as removing the solid residue and keeping the filtered mixture.

In this example, the filtration unit can include a plurality of different filtration devices including active or passive filtration devices. For example, the filtration unit 107 can include a centrifugal filter, gravity filter, vacuum filter, multi-layer filter, or include components of a filtration device from a combination thereof.

In one example, the radiation unit 109 can be configured to receive the filtered mixture from the filtration unit 107. The radiation unit 109 can cure and treat the filtered mixture of the first component 125, second component, and the third component, and produce a gel component and liquid component comprised of the mixture of the first, second, and third component.

In this example, the radiation unit 109, can include a radiation emission device, including one or more light emitting diodes (LED's), one or more laser emitting diodes, one or more lamps such as UV lamps or heat lamps, or a combination thereof. In one example, the radiation emitted can have wavelengths in the range of 1 nm and 1 mm. In this example, the composite apparatus 101 can include a closed loop conveyor in the form of a flexible belt stretched between a component loading station and a separator. In this configuration of the composite apparatus 101, the conveyor can carry one or more flexible trays capable of looping around one or more pulleys of the closed loop conveyor. One of the pulleys can be a driving pulley, equipped with a driving motor. The trays can include shallow troughs that have open tops and carry dosed portions of the liquid and solid mixture from the first, second, and third component. The mixture can then be cured with the radiation on its way sequentially passing under radiation curing equipment, such as that of radiation unit 109.

The mixture can then become a gel through the photopolymerization process. In one example, the liquid mixture of first, second, and third components, can be periodically transferred into trays. The trays can be moved with a predetermined dosed amount of light energy to cure the material to a desired viscosity. In one example, the parameters of the process, such as determining viscosity, radiation dose, and etc., can be controlled manually or automatically controlled by sensors via a central processing unit controlled by a user or a computer application.

In one example, a phase separation unit 111 of the composite apparatus 101 can be configured to separate the gel component and the liquid component produced by the composite apparatus 101 with the radiation unit 109. In one example, the phase separation unit 111 can include one or more separators including a centrifugal separator, drum separator, tray separator, etc., or include components of a separator from a combination thereof.

In the above example, the gelified substance can contain uncured liquid substance during the curing process. At the separation stage, a separation unit 111 can separate the gel substance formed from curing the mixture of the first, second, and third component, from any mixture that was not cured into a gel component and remains a liquid component.

In one example, the liquid component, can be released or removed from the composite apparatus 101. In another example, the liquid component can be reused and recycled back into the mixing reactor of the mixing unit 105, since the liquid component is substantially the same as any new mixture of the first component 121, second component, and third component received by the composite apparatus for producing the composite material 130. The liquid component can be combined with any new mixture mixed by the mixing unit 105, particularly when the mixing unit 105 receives additional material comprising the first component 121, second component, and third component.

In one example, the milling unit 113 is configured to mill the gel component. The milling unit 113 can include a plurality of different milling machines including a shredder, a colloid mill, a grinder, etc., or include components of a milling machine from a combination thereof. In this example, milling the gel unit allows for the gel component to be further mixed with additional components to produce the composite material 130.

In one example, a fourth component, such as a mineral filler, is received by the composite apparatus 101. At this stage, the composite apparatus 101 has either received a fourth component at the same step it received the first component 121, second component, and third component, comprising the mineral filler, or can now receive a fourth component comprising the mineral filler to be mixed with the milled gel component to produce the composite material 130.

In one example, a mixing unit 115 is a mixing reactor and is configured to receive the milled gel component, fourth component, and additional material including the second component, for example additional material of photoinitiator. The mixing unit 115 can mix the remaining one or more components with the gel component. For example, the mixing unit 115 can mix the gel component, the photoinitiator, and the mineral filler to form the composite material 130. The mixing unit 115 can be a mechanical mixing reactor, circulation mixing reactor, pneumatically mixing reactor, ultrasonic mixing reactor, or include components of a mixing reactor from a combination thereof. In this step, the mixing unit 115 can obtain an equally homogenous or heterogenous mixture of components to produce composite material 130.

At this stage, a composite material 130 is produced, which can be a yielded gel-like composite. In one example, the viscosity of the composite material 130 produced by the composite apparatus 101, is in the range of 100,000-600,000 centipoise (cPs).

In one example, additionally, the mixing unit 115 can receive a recycled powder component comprised of a previously produced composite material used for big area 3D printing, and mixed with the milled gel component, second component, third and the fourth components.

Figure 2:
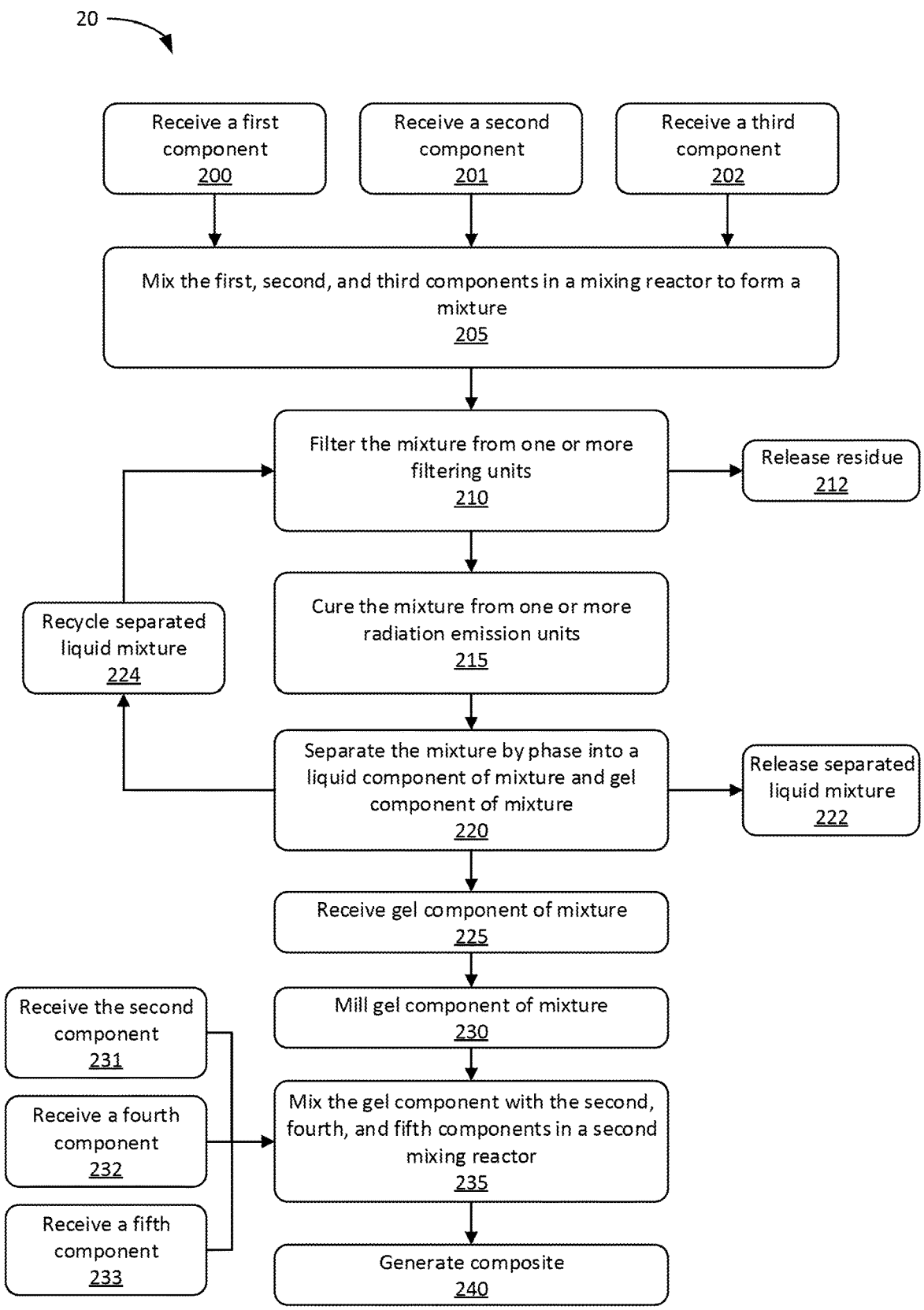
FIG. 2 illustrates an example flow process of producing a composite material in accordance with various aspects of the subject technology.

FIG. 2 illustrates a flow chart an example process of producing a composite material. In one example, the process can be performed for producing a material used in big area 3D printing of construction components or buildings.

In the example flow diagram 20 of FIG. 2, at block 200, a composite apparatus can receive a first component. At block 201, the composite apparatus can receive a second component. At block 202, the composite apparatus can receive a third component.

At block 205, the composite apparatus can mix the first, second, and third components in a mixing reactor to form a mixture.

At block 210, the composite apparatus can filter the mixture from one or more filtering units. At block 212, the composite apparatus can release any residue from the filtration of the mixture including solid residue.

At block 215, the composite apparatus can cure the mixture from one or more radiation emission units to form a gel component.

At block 220, the composite apparatus can separate the mixture by phase into a liquid component of mixture that was not cured into a gel component, and the gel component of the mixture that was formed by the curing step. At block 222, the composite apparatus can release the separated liquid component of the mixture. At block 224, the composite apparatus can recycle the separated liquid component of the mixture back into the filtration step of filtering the mixture of residue form the mixture of the first component, second component, and third component.

At block 225, the composite apparatus can receive the gel component of the mixture.

At block 230, the composite apparatus can mill the gel component of the mixture.

At block 231, the composite apparatus can receive the second component. At block 232, the composite apparatus can receive a fourth component. At block 233, the composite apparatus can receive a fifth component.

At block 235, the composite apparatus can mix the gel component with additional material of the second component, the fourth component, and the fifth component in a second mixing reactor.

And at block 240, the composite apparatus can generate a composite.

Figure 3:
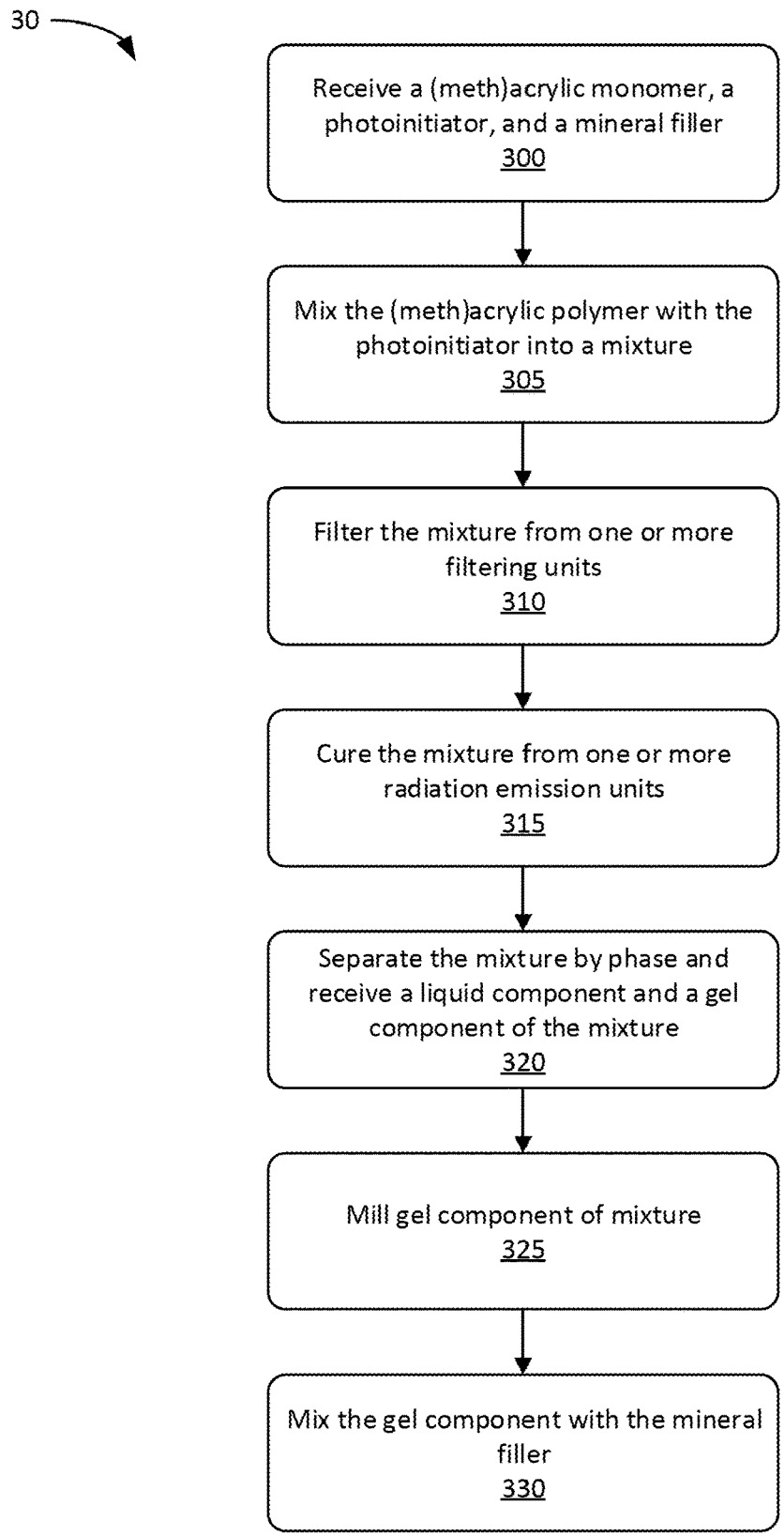
FIG. 3 illustrates another example flow process of producing a composite material in accordance with various aspects of the subject technology.

FIG. 3 illustrates another flow chart of an example process of producing a composite material for big area 3D printing.

In the example flow diagram 30 of FIG. 3, at block 300, a composite apparatus can receive a (meth)acrylic monomer, a photoinitiator, and a mineral filler. The composite apparatus, in one example, can also receive a polymerization enhancer.

At block 305, the composite apparatus can mix the (meth)acrylic polymer with the photoinitiator into a mixture.

At block 310, the composite apparatus can filter the mixture from one or more filtering units.

At block 315, the composite apparatus can cure the mixture from one or more radiation emission units.

At block 320, the composite apparatus can separate the mixture by phase and receive a liquid component and gel component of the mixture.

At block 325, the composite apparatus can mill the gel component of the mixture.

And at block 330, the composite apparatus can mix the gel component with the mineral filler.

Figure 4:
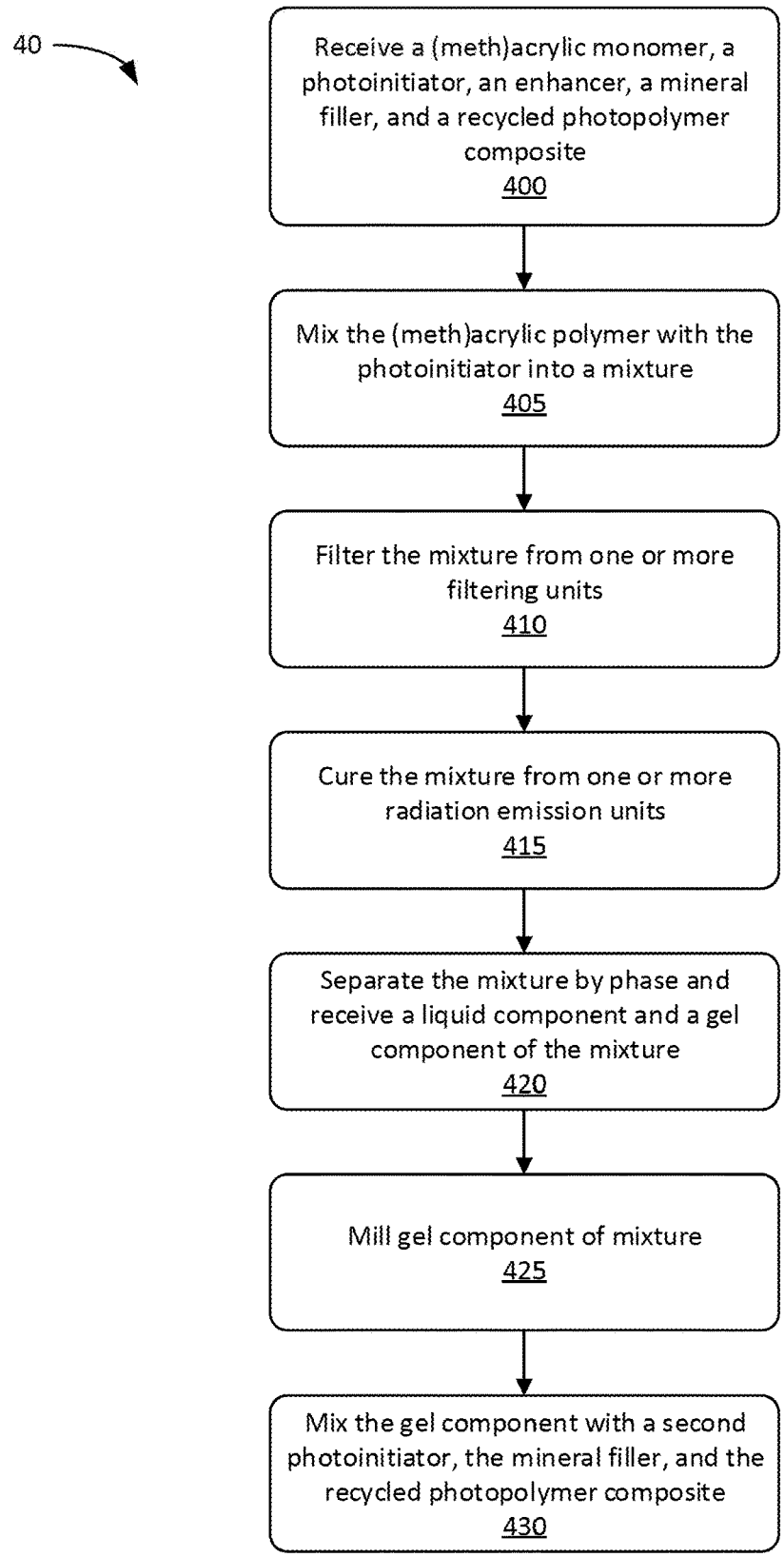
FIG. 4 illustrates another example flow process of producing a composite material in accordance with various aspects of the subject technology.

FIG. 4 illustrates another flow chart of an example process of producing a composite material for big area 3D printing.

In the example flow diagram 40 of FIG. 4, at block 400, a composite apparatus can receive a (meth)acrylic monomer, a photoinitiator, an enhancer, a mineral filler, and a recycled photopolymer composite.

At block 405, the composite apparatus can mix the (meth)acrylic polymer with the photoinitiator into a mixture.

At block 410, the composite apparatus can filter the mixture from one or more filtering units.

At block 415, the composite apparatus can cure the mixture from one or more radiation emission units.

At block 420, the composite apparatus can separate the mixture by phase and receive a liquid component and gel component of the mixture.

At block 425, the composite apparatus can mill the gel component of the mixture.

And at block 430, the composite apparatus can mix the gel component with a second photoinitiator, the mineral filler, and the recycled photopolymer composite.

The terminology used herein is for the purpose of describing particular aspects only and is not intended to be limiting of the disclosure. As used herein, the singular forms "a", "an", and "the" are intended to comprise the plural forms as well, unless the context clearly indicates otherwise. It will be further understood that the terms "comprises", "comprising", or a combination thereof, when used in this specification, specify the presence of stated features, integers, steps, operations, elements, and/or components, but do not preclude the presence or addition of one or more other features, integers, steps, operations, elements, components, and/or groups thereof.

While the disclosure has been particularly shown and described with reference to specific examples thereof, it should be understood that changes in the form and details of the disclosed examples may be made without departing from the scope of the invention. Although various advantages, aspects, and objects of the present disclosure have been discussed herein with reference to various examples, it will be understood that the scope of the disclosure should not be limited by reference to such advantages, aspects, and objects. Rather, the scope of the disclosure should be determined with reference to the claims.

What is claimed is:

1. A method for producing a 3d-printable composite material for large scale printing, the method comprising:
    receiving a first component comprising a (meth)acrylic monomer or a (meth)acrylic oligomer, or a combination thereof;
    receiving a second component comprising a photoinitiator;
    receiving a third component comprising a polymerization enhancer;
    mixing the first component, second component, and third component with a mixing reactor to form a mixture;
    filtering the mixture with a filtration unit and removing a solid residue from the mixture;
    curing the filtered mixture with a radiation unit into a gel component and a liquid component;
    separating the gel component from the liquid component with a phase separation unit;
    milling the gel component with a milling unit;
    receiving a fourth component comprising a mineral filler; and
    mixing the gel component, the photoinitiator, and the mineral filler to form the composite material.

2. The method of claim 1, wherein the first component further comprises from (meth)acrylic functional groups 1 through 6 including triethylene glycol methyl ether methacrylate, triethylene glycol dimethacrylate (TEGDMA), 6-acetylthiohexyl methacrylate, or a combination thereof.

3. The method of claim 1, wherein the photoinitiator is comprised of Bis (eta 5-2,4-cyclopentadien-1-yl) Bis [2,6-difluoro-3-(1H-pyrrol-1-yl)phenyl]titanium, Diphenyl (2,4,6-trimethylbenzoyl)-phosphine oxide, Phenylbis(2,4,6-trimethylbenzoyl)phosphine oxide 2-Benzyl-2-(dimethylamino)-1-[4-(4-morpholinyl) phenyl]-1-butanone, or a combination thereof.

4. The method of claim 1, wherein the polymerization enhancer is comprised of polyethylene glycol 4000, polyethylene glycol 8000, trioctyl benzene-1,2,4-tricarboxylate; di-n-octyl phthalate, or a combination thereof.

5. The method of claim 1, wherein the mineral filler is comprised of sodium carbonate decahydrate, $Na_2CO_3 \cdot 10H_2O$; borax, sodium tetraborate decahydrate, $Na_2B_4O_7 \cdot 10H_2O$; gypsum $CaSO_4 \cdot 2H_2O$; silicon dioxide $SiO_2$, or a combination thereof.

6. The method of claim 1, further comprising receiving a fifth component comprised of a recycled photopolymer composite material.

7. The method of claim 1, further comprising mixing the gel component, the photoinitiator, the mineral filler, and the recycled photopolymer composite material.

8. The method of claim 1, wherein the composite material is used for big area 3D printing of construction components like wall panels and complete building modules.

9. A method for producing a 3d-printable material for large scale printing, the method comprising:
    receiving a first component comprising a first material;
    receiving a second component comprising a second material;
    receiving a third component comprising a third material;
    mixing the first component, second component, and third component to form a mixture;
    filtering the mixture and removing a solid residue from the mixture;
    curing the filtered mixture into a gel component and a liquid component;
    separating the gel component from the liquid component;
    milling the gel component;
    receiving a fourth component comprising a fourth material; and
    mixing the gel component, the second component, and the fourth component.

10. The method of claim 9, further comprising recycling the liquid component and combining the liquid component with the mixture.

11. The method of claim 9, wherein the first material is a (meth)acrylic monomer or a (meth)acrylic oligomer, or a combination thereof.

12. The method of claim 9, wherein the second material is a photoinitiator.

13. The method of claim 9, wherein the third material is a polymerization enhancer.

14. The method of claim 9, wherein the fourth material is a mineral filler.

15. The method of claim 9, further comprising receiving a fifth component comprising a fifth composite material, the fifth composite material being a recycled photopolymer composite material.

16. The method of claim 15, further comprising mixing the gel component, the second component, the fourth component, and the recycled photopolymer composite.

\* \* \* \* \*